Dec. 2, 1969 L. G. SMITH, JR 3,482,085

BINARY FULL ADDER-SUBTRACTOR WITH BYPASS CONTROL

Filed June 23, 1966 3 Sheets-Sheet 1

INVENTOR.
LOUIS G. SMITH, Jr.

BY

Barnes, Kisselle, Raisch & Choate

ATTORNEYS.

INVENTOR.
LOUIS G. SMITH, Jr.
BY
Barnes, Kisselle, Raisch & Choate
ATTORNEYS.

BINARY FULL ADDER-SUBTRACTOR WITH BYPASS CONTROL

INVENTOR.
LOUIS G. SMITH, Jr.
BY
Barnes, Kisselle, Raisch & Choate
ATTORNEYS.

United States Patent Office 3,482,085

Patented Dec. 2, 1969

3,482,085

BINARY FULL ADDER-SUBTRACTOR WITH BYPASS CONTROL

Louis G. Smith, Jr., Pontiac, Mich., assignor to Detrex Chemical Industries, Inc., Detroit, Mich., a corporation of Michigan Filed June 23, 1966, Ser. No. 563,944
Int. Cl. G06f *7/385, 7/50*
U.S. Cl. 235—176 8 Claims

ABSTRACT OF THE DISCLOSURE

A full binary adder-subtractor is disclosed which is provided with a bypass control. The bypass control has the effect of suppressing the arithmetic operation of the adder-subtractor and causing one of the arguments to the operation to be produced at the output; however, the borrow or carry signal is still produced as if the operation had not been suppressed. The bypass control might be generated, for example, as when a negative difference would be produced by the suppressed operation. The adder-subtractor has particular application in matrix arithmetic units capable of the more complex arithmetic operations of multiply, divide, root taking, power generation, etc., and is preferably constructed or semi-conductor logic circuits.

BACKGROUND OF THE INVENTION

Field of the invention

This invention relates generally to an improved binary arithmetic unit and, more particuarly, to a full binary adder-subtracter such as used in computing or data processing equipment but with the added capabiity of bypass control.

As is adequately shown in prior literature, when it is desired to add two binary numbers, i.e., to add an addend to an augend, a full binary adder is needed for each binary position. A full binary adder is a device which will add three binary digits (bits) and produce a sum output (T) and also a carry output (G) for the next most significant binary position. A full binary adder must satisfy the following truth table:

Truth Table No. 1

| | P | E | F | T | G |
|---|---|---|---|---|---|
| | 0 | 0 | 0 | 0 | 0 |
| | 1 | 0 | 0 | 1 | 0 |
| | 0 | 1 | 0 | 1 | 0 |
| . +E+F=T+G | 1 | 1 | 0 | 0 | 1 |
| | 0 | 0 | 1 | 1 | 0 |
| | 1 | 0 | 1 | 0 | 1 |
| | 0 | 1 | 1 | 0 | 1 |
| | 1 | 1 | 1 | 1 | 1 |

The truth table shows in its first three columns the eight possible combinations of inputs: augend (P), addend (E) and carry in (F). The fourth column shows the sum output (T) for each of these eight combinations, and the fifth column shows the carry out (G) output for each of these eight combinations.

Conversely, when it is desired to subtract one binary number from another, i.e. to subtract a subtrahend from a minuend, a full binary subtracter is needed for each binary position. A full binary subtracter is a device which will subtract a subtrabend binary digit (bit) from a minuend digit (bit) and produce a difference bit and a borrow out bit if such should be required. Furthermore, it will subtract from this difference a borrow in bit generated in the next lower significant stage and will produce a final difference bit and/or borrow bit as required. A full binary subtracter must satisfy the following truth table:

Truth Table No. 2

| | P | E | F | T | G |
|---|---|---|---|---|---|
| | 0 | 0 | 0 | 0 | 0 |
| | 1 | 0 | 0 | 1 | 0 |
| | 0 | 1 | 0 | 1 | 1 |
| P−E−F=T+G | 1 | 1 | 0 | 0 | 0 |
| | 0 | 0 | 1 | 1 | 1 |
| | 1 | 0 | 1 | 0 | 0 |
| | 0 | 1 | 1 | 0 | 1 |
| | 1 | 1 | 1 | 1 | 1 |

This truth table shows in its first three columns the eight possible combinations of minuend (P), subtrabend (E) and borrow in (F). The fourth column shows the difference (T) output for each of these eight combinations, and the fifth column shows the borrow out (G) output for each of these eight combinations.

In addition to the add and subtract functions, an arithmetic unit, to be truly useful, must also be capable of modifying or adjusting these add or subtract functions in accordance with the needs encountered in the more complex arithmetic operations of multiply, divide, root taking, power generation, etc. Such operations impose on the arithmetic unit the additional requirement that it must be capable of functioning in such a manner as to bypass or ignore a subtrahend or addend with respect to the difference or sum outputs, respectively, and yet continuously provide a signal indicating a borrow or carry just as if the subtrahend or addend were to be used in the particular operation. This bypass function, briefly explained here, is more fully explained in copending application Ser. No. 635,552 filed May 2, 1967. We shall refer below to this bypass control or function as the K control or function.

To accomplish these bypass functions, the arithmetic unit must satisfy the additional truth tables following:

Truth Table No. 3

| | K | P | E | F | T | G |
|---|---|---|---|---|---|---|
| | 1 | 0 | 0 | 0 | 0 | 0 |
| | 1 | 1 | 0 | 0 | 1 | 0 |
| | 1 | 0 | 1 | 0 | 0 | 0 |
| P+E+F with K | 1 | 1 | 1 | 0 | 1 | 1 |
| | 1 | 0 | 0 | 1 | 0 | 0 |
| | 1 | 1 | 0 | 1 | 1 | 1 |
| | 1 | 0 | 1 | 1 | 0 | 0 |
| | 1 | 1 | 1 | 1 | 1 | 1 |

Truth Table No. 4

| | K | P | E | F | T | G |
|---|---|---|---|---|---|---|
| | 1 | 0 | 0 | 0 | 0 | 0 |
| | 1 | 1 | 0 | 0 | 1 | 0 |
| | 1 | 0 | 1 | 0 | 0 | 1 |
| P−E−F with K | 1 | 1 | 1 | 0 | 1 | 0 |
| | 1 | 0 | 0 | 1 | 0 | 1 |
| | 1 | 1 | 0 | 1 | 1 | 0 |
| | 1 | 0 | 1 | 1 | 0 | 1 |
| | 1 | 1 | 1 | 1 | 1 | 1 |

Table No. 3 shows the add function with bypass control and Table No. 4 shows the subtract function with bypass control.

These truth tables reflect the actual results obtained from the arithmetic units described below as preferred embodiments. It is recognized that line 7 of Table No. 3 is inaccurate since the carry out G should be 1 for the add function with K control. However, the simplicity of the preferred embodiments is advantageous for the subtract function which is of primary importance when the improved arithmetic unit is used in a matrix for performing division and root taking. The K factor is rarely required for addition, but the preferred circuits can be redesigned to correct the above inaccuracy if so desired.

Description of the prior art

The need for the K function is derived from an improved method and apparatus for accomplishing division or root taking as described in the co-pending application. However, let us discuss here briefly the prior art and the improvement. Assume it is desired to divide a binary number such as 10110101=181 by a number such as 1101=13. In the prior art, one sets up a series of trial substractions as indicated below:

EXAMPLE 1

| | | |
|---|---|---|
| | | 1101⌋10110101 |
| | −10110101 | |
| Try (1) | 1101 | |
| Diff. NP | 11111110 | |

The difference results in a negative number, therefore add 1101 thus: (The P after "Diff" indicates a permitted trial substraction or positive difference and an NP indicates a not permitted trial substraction or negative difference.)

EXAMPLE 2

| | | |
|---|---|---|
| | − 10110101=181 Quotient<br>1101 | |
| | 1111110<br>+ 1101 | 0 |
| Try (2) | 10110101<br>1101 | |
| Diff. P<br>Try (3) | 1001<br>1101 | 1 |
| Diff. P<br>Try (4) | 0110<br>1101 | 1 |
| Diff. NP<br>Add | 1111111<br>1101 | 0 |
| Try (5) | 11001<br>1101 | |
| Diff. P | 1100 | 1 |

where the quotient is 01101 or 13 and the remainder is 1100 or 12.

This prior art technique, while accurate, is inefficient with respect to time, operations, and hardware. The extra steps resuired to add a compensating value when a "not permitted" subtraction is attempted significantly slows down the division process, since the additional steps of addition are not pertinent to the problem and represent inefficient machine usage.

Furthermore, in those cases where the division is done in a matrix, the inclusion of matrix elements to handle the corrective additions doubles the size of the required matrix. Moreover, if the matrix size is reduced, then the corrective addition must be performed by bistable elements which isolate the remaining calculations from the initial divisor and dividend. The result is that, if a change occurs in the divisor or the dividend, then complex, usually expensive, circuitry must be used to detect the change, halt the process and recycle, thereby increasing the effective response time of the unit. These foregoing difficulties while bad enough with respect to division, are much more serious in the problems involving root taking.

In the copending application referenced above, inventions that correct this difficulty are described. As a result of these inventions, the same division would be performed as follows:

EXAMPLE 3

| | Matrix portrayal | Quotient |
|---|---|---|
| K | 10110101<br>11010000 (bypass) | |
| * | 10110101<br>1101000 | 0 |
| | 1001101<br>110100 | 1 |
| K | 011001<br>11010 (bypass) | 1 |
| * | 11001<br>1101 | 0 |
| | 1100 | Remainder 1 |

The * indicates a sensed unsatisfied borrow (representing a negative difference) which generates a K control signal which in turn causes the associated trial subtrahend to be bypassed and the minuend for that matrix level to be repeated on the output terminals for that level so as to be able to serve as the minuend for the next lower level trial substraction.

The advantages of a computer operating with K control are fully discussed in the copending application, and include: (1) operation time is not materially increased by "not permitted" trial subtractions; (2) the matrix size remains optimum; (3) no expensive or complex correction mechanisms or programs are required; and (4) the bypassed trial subtrahends are always available in the event a change in either the divisor or the dividend should permit their use.

The fourth advantage is very important in that it permits the computer to operate must closer to real time than is possible with prior art digital arithmetic complexes. In other words, this invention provides direct and continuous control of the matrix elements by the digital input number signals, thereby permitting calculations to be performed as close to real time as allowed by the time response characteristics of the components employed.

Even though the improved arithmetic unit is described herein as a part of full parallel or matrix arithmetic complexes, it is to be understood that the same advantages result when the arithmetic unit is used in serial or block serial arithmetic complexes.

Many prior art full binary adders and subtracters are known. However, none is known which has the capability of bypassing a function, while at the same time maintaining "circuit awareness" of the effect of not bypassing the function. Such a capability is particularly required in the high speed utilization of parallel computation techniques generally and, in certain aspects, serial computation techniques. This capability is especially important when the arithmetic unit is combined in an arithmetic complex (see the above copending application) which is to perform multiplication, division, power generation and root taking without non-pertinent peripheral computations.

In addition, prior art full binary adders and subtracters usually have certain disadvantages in that (1) they rely on so-called standard logic symbols for their formation and explanation, and (2) they are constructed unilaterally in terms of either increased signal logic or decreased signal logic. The first restriction is detrimental in that it does not easily show where elements of an "AND" gate may, for example, combine with, or perform duties in, an "OR" gate in order to perform some such function as "inhibit or." The second restriction generally results in the inclusion of devices, such as inverters, to convert signals, that have been changed from plus logic to minus logic by the mathematics, back to plus logic. Both restrictions result in undue circuit complexity and the incorporation of unnecessary active or passive elements with attendant increase in circuit delay, instability and unreliability.

For example, an important feature of this invention is the provision of an improved adder-subtracter having means for bypassing a function, such as addend or subtracting a subtrahend, but at the same time providing a signal representing a carry or borrow which would have been generated if the function had not been bypassed.

In the prior art, there is a diversity of methods for representing the signal state of the various points of a logical block diagram, such as: high, low; 1, 0; heavy, light; +, 0; 0, —; or +, —. All of these are an attempt to portray clearly and concisely the presence or absence of a signal which in turn may be defined to be a zero or one or whatever other symbol may be pertinent to the device in question. This problem of choosing appropriate symbols is further complicated by the well-known capability of most computing devices to work interchangeably in two different modes depending on the input signals; thus, a conventional diode-resistor "OR" gate for circuits where a high voltage represents a logical 1 and a low voltage represents a logical zero, will function as an "AND" gate in those circuits where a high voltage represents a logical zero and a low voltage represents a logical one.

Since this invention uses both logic conditions, it becomes expeditious to define the signal states only in terms of whether or not a signal exists. This will create no hardship for those skilled in the art and will provide a much simplified explanation. For those less skilled, the explanation, below, of the operation of the preferred embodiment of FIG. 4 will supply the necessary technical detail.

Accordingly, a zero is considered to exist at any point in a logic device when that point is at its "at rest" or "null" state as determined by the condition that all input signals to the device are zero. Conversely, a "one" is said to exist when the point is significantly disturbed from its null position or state. In the same sense the two conditions will be designated as N for null or "no signal," i.e. zero, and Y for the disturbed or "one" state.

Summary of the invention

Therefore, the primary object of the invention is to provide an improved arithmetic unit having a function bypass control.

Another object is to provide an improved full binary adder-subtracter having means to bypass a function and also means to generate a signal representing the effect of the bypassed function just as if it had not been bypassed.

A further object is to provide an improved binary arithmetic unit which can be controlled to perform either addition or subtraction.

Still another object is to provide an improved logic circuit incorporating suppression logic to provide function bypass control in addition and subtraction operations.

A further object is to provide an improved semiconductor arithmetic unit having add-subtract control and function bypass control.

A more specific object of the invention is to provide a full binary subtracter having means to bypass a subtrahend which would produce a negative difference and also having means to produce a signal representing a borrow which would have been generated if the subtrahend had not been bypassed.

Briefly, in accomplishing the foregoing object in a preferred embodiment of the invention, there is provided a full binary adder-subtracter having add, subtract and bypass control terminals. When the bypass control signal is activated, a function (such as an add or subtract operation) is bypassed so that the input appears at the output unaffected by the function, but at the same time, there is generated a signal representing the effect (a borrow or carry) of the function as if it had not been bypassed.

Brief description of the drawings

The foregoing and other objects and advantages of the invention will become apparent from the following description read in conjunction with the accompanying drawings in which.

Description of the preferred embodiment

Figure 1:
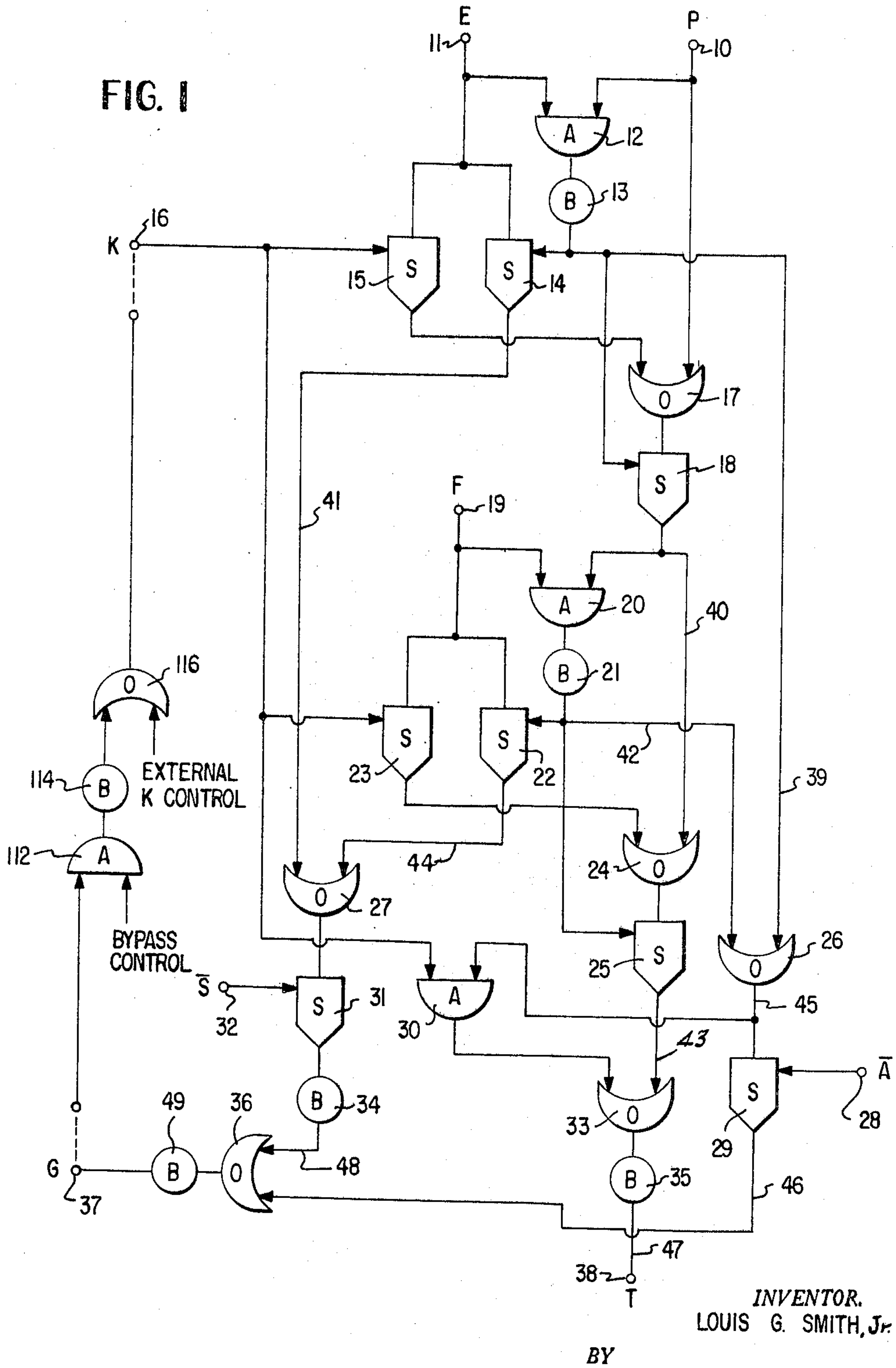
FIGURE 1 is a logic diagram of an improved binary arithmetic unit utilizing suppression logic having add-subtract control and function bypass control.

In FIG. 1 there is illustrated a preferred embodiment of the improved full adder or full subtracter particularly suitable for use in one bit position in a matrix designed for the rapid solution of problems involving addition, subtraction, multiplication, division, root derivation, power derivation, etc. At the same time, it adds to such a matrix the novel feature of bypass or K control described earlier. As such, it must be capable of adding one to three bits on command and producing a sum and, if required, a carry signal. Furthermore, in performing division, it must be capable of subtracting one or two bits from zero or one and producing the proper difference and borrow signals. Beyond these requirements, and as described in detail below, it must be capable of producing appropriate carry or borrow signals without affecting the sum or difference signals under certain conditions.

Figures 2A, 2B, 2C, 2D, 3A, 3B:
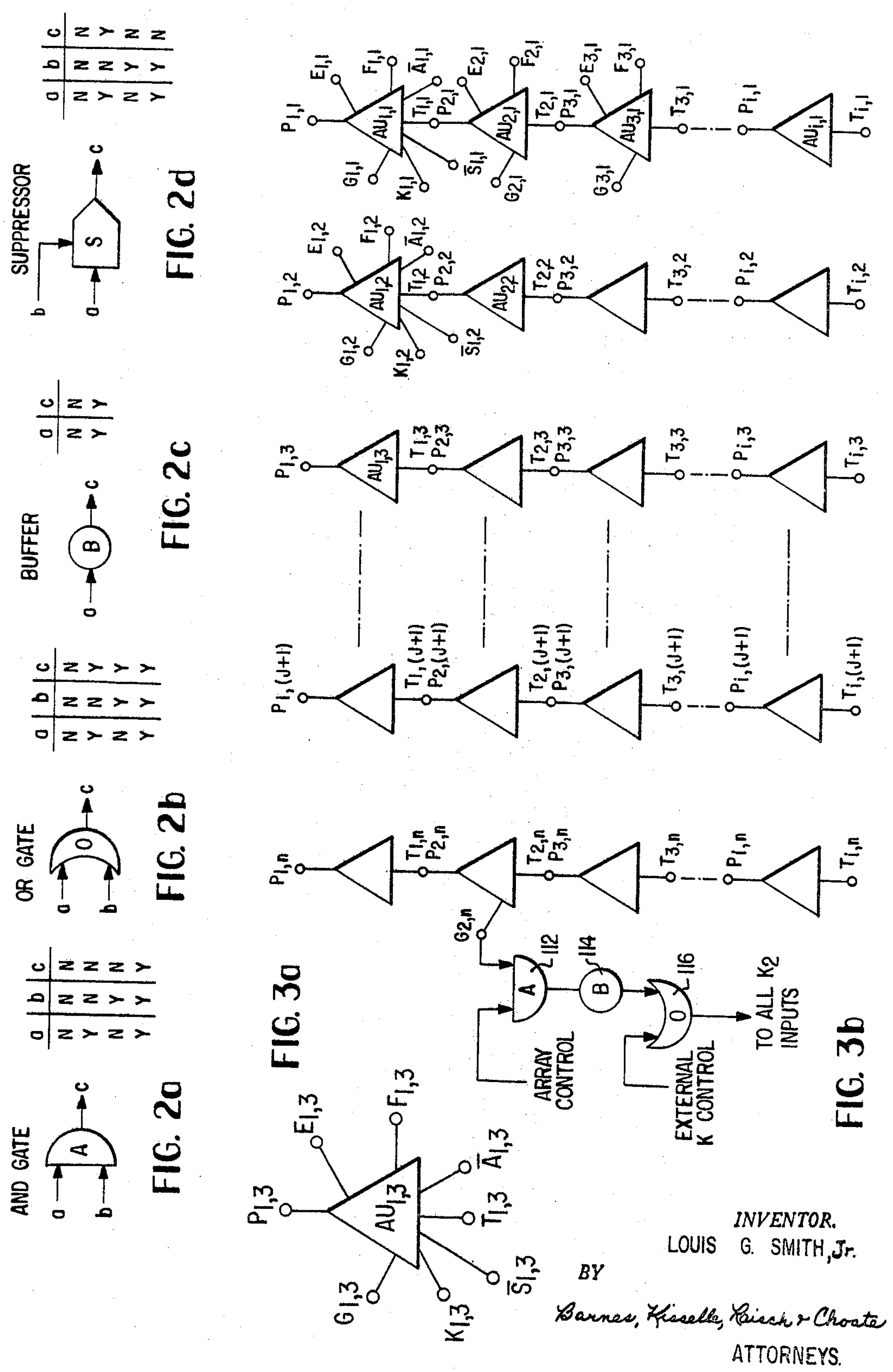
FIGURES 2*a*, 2*b*, 2*c* and 2*d* identify the logic elements used in FIGURE 1 together with their truth tables.
FIGURE 3*a* is a block diagram of the improved arithmetic unit.
FIGURE 3*b* is a schematic block diagram of a portion of a matrix or arithmetic complex in which the improved arithmetic unit is particularly useful.

FIGURES 2*a*, 2*b*, 2*c* and 2*d* show the logic elements used in the logic circuit of FIGURE 1. AND gate A of FIG. 2*a* is difined as a device that produces a Y signal on output *c* only when both inputs *a* and *b* are Y.

The OR gate O of FIG. 2*b* produces a Y output when either one or both inputs are Y.

The buffer B of FIG. 2*c* produces a Y output whenever its input is Y and whether it inverts is immaterial.

FIG. 2*d* shows a suppressor S having the property of producing an N signal on output *c* whenever a Y signal is applied to the gate control input *b* regardless of the condition of the signal on input *a*. When an N signal (i.e. absence of a signal) is applied to control input *b*, suppressor S produces a Y signal on output *c* only when a Y signal is applied to input *a*.

Let us now return to FIGURE 1. Terminals 10 and 11 receive the bit signals of the augend (or minuend) and addend (or subtrahend), respectively, and terminal 19 receives the carry in (or borrow in) signal from the next lower order stage. The control input terminals 16, 28 and 32 receive control signals which set the mode of the arithmetic unit and will be discussed later. The sum or difference signal appears on terminal 38 and the carry out or borrow out on terminal 37.

Operation of the improved arithmetic unit as a full binary adder will now be described for the eighth condition, or row 8, of Truth Table No. 1. For this condition, the inputs are:

Example 4

| K | $\overline{\text{Sub}}$ | $\overline{\text{Add}}$ | P | E | F |
|---|---|---|---|---|---|
| N | Y | N | Y | Y | Y |
| 0 | 1 | 0 | 1 | 1 | 1 |

The overscored terms are to be read, "not subtract" and "not add," meaning that a Y signal establishes the "not" condition.

From FIG. 1, it can be seen that the Y signal on terminals 10 and 11 combine to produce a Y in the output of AND gate 12 and accordingly a Y in the output of buffer 13. At the same time, the Y on terminal 11 produces a Y at the inputs of suppressors 14 and 15. Suppressor 14 however is closed by the control input Y supplied by buffer 13 resulting in an N on line 41.

On the other hand, the Y on the input of suppressor 15 is transmitted to the output of 15 since the gate is open because of the N signal impressed thereon from the K control entry, 16. The Y on the output of 15 is impressed on one input of OR gate 17 causing a Y in the output of 17 and subsequently a Y on the input of suppressor 18. It will be noted also that the Y on input terminal 10 is impressed on one input of OR gate 17 causing a Y in the output of 17 also.

The Y on the input of suppressor 18 is not transmitted however, since gate 18 is closed due to the action of the Y signal from buffer 13 which is impressed on the control input of gate 18.

It will also be noted that the Y signal in the output of buffer 13 is impressed on line 39.

The critical signal conditions as of this stage in the explanation can be summarized as follows:

EXAMPLE 5

| | |
|---|---|
| K | N |
| $\overline{\text{Sub}}$ | Y |
| $\overline{\text{Add}}$ | N |
| Line **39** | Y |
| Line **40** | N |
| Line **41** | N |
| Input **19** | Y |

Resuming the description from this point, it can be seen that the Y signal at input 19 and the N signal on line 40 are both impressed as inputs to AND gate 20. From the truth table, this combination produces an N signal in the output of gate 20 which is impressed on the input of buffer 21, producing an N signal in the output of buffer 21. The Y signal on input 19 is also applied as an input to suppressor 22. Since the control gate of suppressor 22 is driven by the N signal from buffer 21, there will be a Y signal in the output of suppressor 22 which will appear on line 44. In like fashion, the Y signal on input 19 is also impressed as an input to suppressor 23. The control gate of this suppressor has an N signal from the K control input 16; therefore, the Y signal will appear on the output of suppressor 23 and accordingly be impressed on one input of OR gate 24. The other input to OR gate 24 is the N signal on line 40. However, by the truth table for OR gates, only one Y signal is required to produce a Y signal in the output and, therefore, there will be a Y signal from the output of OR gate 24 applied to the input of suppressor 25. The control gate of suppressor 25 is driven by the N signal from buffer 21, therefore, there will be a Y appearing at the output of suppressor 25 and impressed on line 43. Finally, the N signal output of buffer 21 appears on line 42.

Summarizing the critical signal conditions as of this stage of the explanation:

EXAMPLE 6

| | |
|---|---|
| K | N |
| $\overline{\text{Sub}}$ | Y |
| $\overline{\text{Add}}$ | N |
| Line **39** | Y |
| Line **42** | N |
| Line **43** | Y |
| Line **41** | N |
| Line **44** | Y |

Resuming the explanation, it is seen that the N signal on line 41 and the Y signal on line 44 are impressed as inputs to OR gate 27, producing a Y signal at the output of OR gate 27 which is impressed as a Y input to suppressor 31. Suppressor 31, however is closed because of the Y control gate signal impressed from $\overline{\text{Sub}}$ input 32. The result is an N signal on the output of suppressor 31 being impressed on the input of buffer 34 causing an N signal on the output of 34 and on line 48. Similarly, the N signal on line 42 and the Y signal on line 39 are impressed as inputs to OR gate 26, producing a Y in the output of OR gate 26 which is impressed on the input of suppressor 29. Suppressor 29 is open because of the N signal received from $\overline{\text{Add}}$ input 28; therefore, there will be a Y signal appearing on the output of suppressor 29 and accordingly on line 46.

It will be recalled that the output of OR gate 26 was a Y signal appearing on line 45. Now considering AND gate 30, it is apparent that one input of this gate is supplied from input 16, the K control input, which is an N signal. The other input of gate 30 is the Y signal impressed from the output of OR gate 26. These two inputs to AND gate 30 produce an N signal in the output which is impressed as an input to OR gate 33. The other input to OR gate 33 is the Y signal from line 43. These two inputs combine to produce a Y signal in the output of OR gate 33, which is impressed as an input to buffer 35, resulting in a Y signal output from buffer 35 which appears on line 47 and thence on output terminal 38, which is the sum or difference output of the add-subtract unit. Similarly, the N signal on line 48, and the Y signal on line 46, are imposed as inputs on "OR" gate 36, resulting in a Y signal output from "OR" gate 36 which appears on output terminal 37, the borrow/carry output of the arithmetic unit.

Summarizing the critical signals as they appear finally:

EXAMPLE 7

| | | | | | | | | | |
|---|---|---|---|---|---|---|---|---|---|
| By designation | K | S | A | P | E | F | T | G | |
| By terminal number | 16 | 32 | 28 | 10 | 11 | 19 | 38 | 37 | Terminals. |
| By symbol | N | Y | N | Y | Y | Y | Y | Y | |
| By binary number signal | 0 | 1 | 0 | 1 | 1 | 1 | 1 | 1 | Signals. |

It is apparent that line 4 of the above table in the last five columns is identical to line 8 of Truth Table No. 1, which was to be shown. With the foregoing in mind, let us now review the logic required of an arithmetic unit if it is to fulfill the requirements of such a unit in an arithmetic complex. In FIG. 3*a*, there is shown a block diagram representative of an improved arithmetic unit $AU_{1,3}$, which has terminals lettered to correspond with FIG. 1. FIGURE 3*b* shows a plurality of similar arithmetic units arranged in a matrix to perform calculations as described in more detail in co-pending application Ser. No. 635,552, filed May 2, 1967. Let us now consider unit $AU_{1,3}$, from row 1, column 3, of the matrix. For the condition of "add," the augend is applied at input $P_{1,3}$, the addend is applied at input $E_{1,3}$, and the borrow/carry from a previous stage is supplied to input $F_{1,3}$ The borrow/carry output is taken from output terminal $G_{1,3}$ and the sum digit output appears on terminal $T_{1,3}$. There are three control inputs: $\overline{A}$ or "not add"; $\overline{S}$ or "no subtract"; and K or bypass.

For the operation of "add," as required in addition, multiplication, power generation, etc., the control input signals will be established as follows:

EXAMPLE 8

| | |
|---|---|
| "Not" signal, or N | K control. |
| Y signal indicating "do not substract" | $\overline{S}$. |
| No signal, or N, indicating "do not add", i.e. "add" | $\overline{A}$. |

The logic arguments for this operation may be stated as follows: (1) If there is an augend and there is not an addend and there is not a carry, then there must be a sum output of 1, i.e. Y signal, on the T output terminal, and there must not be a carry output, i.e., N signal, on the G output terminal. (2) Similarly, if there is an augend existing on the P entry and an addend exists on the E entry, then there must be a zero on the T exit and a 1 on the G exit. (3) Using well-known Boolean algebra symbols, step (1) can be written, $$P\overline{E}\overline{F}=T\overline{G} \qquad \text{(Ex. 9)}$$

and step (2) can be written, $$PE\overline{F}=\overline{T}G \qquad \text{(Ex. 10)}$$

Continuing this one step further, by substituting 1's and zeros for the "signals" or "no signals" respectively, one can summarize the add operations to the eight possibilities shown in truth table number 1.

The same logic applied to the subtract operation yields the results shown in Truth Table No. 2.

For application of the arithmetic unit to the general operation of "multiply," wherein the various multiplication partial products are supplied to a matrix multiplier as addends, it is obvious that the "add" operation pertains throughout all phases.

Divide, on the other hand, is conventionally performed as a series of trial subtractions. In co-pending application, Ser. No. 635,552, there is discussed in detail the operation of the matrix and the necessary logical steps for division to provide trial subtractions and yet retain capability of having the output (answer) directly and continuously responsive to changes in the divisor or the dividend. Reference should be made to that application for greater understanding of the process. It is sufficient here to state, however, that in the case of a not-permitted subtraction in the division or root taking process, it is essential that an unsatisfied borrow signal (one that, if it were used, would cause a negative difference) be maintained to indicate the unsatisfied, or not-permitted, subtraction condition. At the same time, in such a case it is required that the inputs appearing at the E and F terminals of the particular row of the matrix of arithmetic units not affect the output signals appearing at the T terminals. In other words, the information at the P terminals of the row must be repeated at the T terminals of that row, and the borrow conditions (if the E and F inputs of that row are used) must be maintained. For this reason, there is provided as an important feature of this invention, a bypass or K control circuit.

The need for K or bypass control in "add" operations is not as obvious, but there are certain conditions in the evaluation of mathematical series or in curve fitting where it is desirable to have this bypass capability. For example, it is advantageous to know when the addition of a certain sum causes a carry to be extended to the left beyond a certain column of the matrix. If there are undue mathematical calculations or test operations, then this particular certain sum should be recorded continually in the add matrix, yet its effect on the total be nil.

A description of the function of the K control requires reference again to FIG. 1. In the case of subtraction, the truth table under K control changes from that shown in Truth Table No. 2 to that shown in Truth Table No. 4. Looking at FIGURE 1, it is seen that the application of a K control signal to terminal 16 by means of suppressor gates 15 and 23 prevents any input signal supplied to subtrahend input 11 or to borrow input 19, respectively, from entering the sum chains formed by elements 17, 18, 40, 24, 25, 43, 33, 35, 47, and T or sum output terminal 38. At the same time, however, note that the effects of the subtrahend E or the borrow in F with respect to developing a borrow out signal G are determined by chain 11, 14, 41 for the subtrahend and chain 19, 22, 44 for the borrow in. Consequently, chain 27, 31, 34, 48, 36, 49 and G borrow out terminal 37 is not suppressed and produces the borrow out signal which would have been generated if the difference output T had not been suppressed for the trial subtraction.

In addition, through "AND" gate 30 and "OR" gate 33, the K or bypass signal, along with a possible borrow signal, serves to regenerate at terminal T a sum signal that might otherwise be lost. The logic of this operation is as follows. With respect to the minuend and the subtrahend, the combination of "AND" gate 12, buffer 13 and suppressor 18 serves to provide a sum output of zero in those cases where both the minuend and the subtrahend exist as 1's. Similarly, in the case of the borrow and a possible sum output on line 40, the combination of "AND" gate 20, buffer 21 and suppressor 25 serves to assure a zero sum output for those conditions wherein a minuend and a subtrahend or a borrow exist. In Boolean terminology, this is stated as, $$P(E\overline{F}+\overline{E}F)\overline{K}=\overline{T} \qquad \text{(Ex. 11)}$$

Under the K condition, however, the above equation must read, $$P(E\overline{F}+\overline{E}F)K=T \qquad \text{(Ex. 12)}$$

because in division, where a trial subtraction is not permitted, the P input must appear as a sum at the T output terminal 38. Since the described logic chains, when a K signal appears, would suppress this sum signal, it is necessary to regenerate the P signal as a sum signal at the T output terminal 38. The logic followed to accomplish this is that, if there is a K signal and there is a borrow signal on line 45, then there must have been both a P signal and an E signal; therefore, there must be a Y signal at the T output. To produce this result, the K signal (Y) from input 16 and the borrow signal (Y) from line 45 are applied to the inputs of "AND" gate 30, thereby producing a Y signal on its output which is then applied to one of the inputs of "OR" gate 33, which transmits a Y signal through buffer 35 and via line 47 to T output terminal 38.

Figure 4:
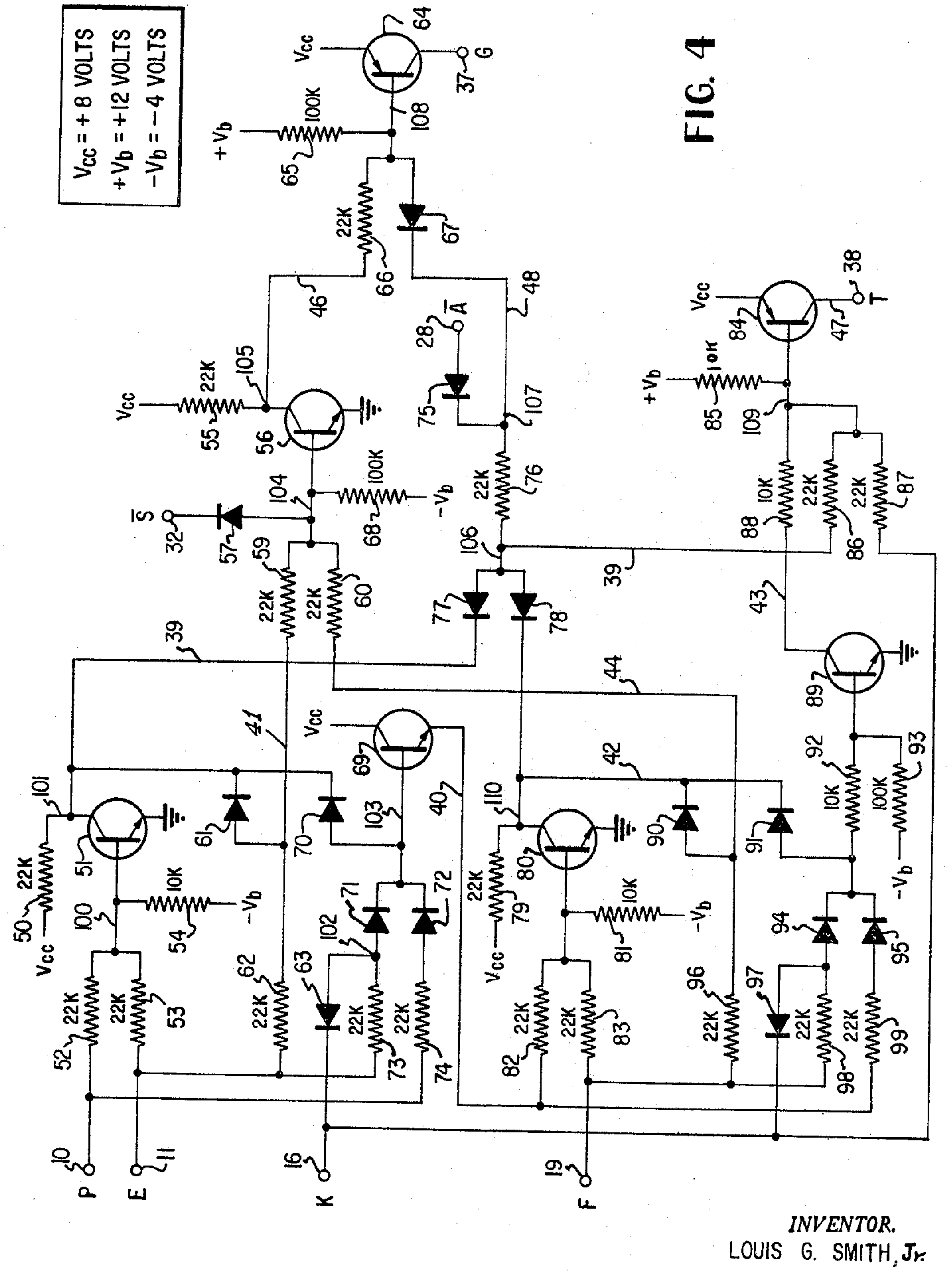
FIGURE 4 is a schematic diagram of a preferred transistor circuit implementing the logic circuit of FIGURE 1.

FIGURE 4 is a schematic diagram of a preferred electronic circuit implementing the logic circuit of FIG. 1. It is to be noted that this preferred embodiment does not include speed up devices such as capacitors, back biased diodes, anti-saturation or anti-cutoff clamps, or precisely adjusted voltages since the use of these techniques is well-known in the art and incorporation is not essential to the novel operation of the invention. Resistor and voltage values within ±5% of stated values when used with nominal beta range PNP transistors similar to 2N404's or 2N414's and NPN transistors similar to 2N1302's or 2N1306's and diodes similar to 1N126's should provide adequate performance. Of course, different operating parameters such as high speed, or low current, or different or even inverted signal polarities, or diverse ambient environments may require different design parameters.

The resistors 52, 53, and 54, the bias supply voltage $-V_b$ and the emitter-base characteristics of transistor 51 comprise the "AND" gate 12 of FIG. 1. Similarly, the resistors 82, 83 and 81, the bias supply voltage $-V_b$ and the emitter-base characteristics of transistor 80 comprise the "AND" gate 20 of FIG. 1. Their operations are identical, so only "AND" gate 12 will be explained. The values of the resistors and the bias potential $-V_b$ are so chosen that a positive Y signal on either the P input 10 or the E input 11, but not on both, will leave point 100 at a potential below that slight positive (with respect to ground) potential required at the base of transistor 51 to cause conduction in transistor 51. However, when Y signals (positive) are applied simultaneously to both the P input 10 and the E input 11, point 100 will be raised to a high enough potential to cause base current flow in transistor 51, which, as is well known, produces an amplified collector current flow, thereby lowering the potential at the collector of transistor 51, point 101, to a value very slightly above ground, corresponding to a Y negative signal on point 101.

The resistor 62 and the diode 61 comprise the suppressor 14 of FIG. 1. Its action is such that a Y (+) signal impressed on terminal 11 transmitted through resistor 62 would tend to raise line 41 to a level considerably above ground; however, in the event that a Y (+) signal appears on both terminals 10 and 11, then the previously defined "and" action at point 100 causes transistor 51 to conduct. Transistor 51 and its collector resistor 50 comprise the buffer of FIG. 1. As mentioned earlier, when this transistor conducts, the point 101 is maintained at a position only slightly above ground due to the low impedance of transistor 51. This constitutes a Y (−) signal which is impressed through diode 61 as the suppress or control input of buffer 14 of FIG. 1, holding line 41 at a very low potential constituting an N (−) signal on line 41.

Similarly, resistor 73 and diode 63 comprise the suppressor 15 of FIG. 1. The action again is such that a Y signal on terminal 11, in the absence of a Y (−) signal on terminal 16, will raise point 102 considerably above ground as a Y (+) signal; however, a Y (−) signal appearing at terminal 16 and transmitted through diode 63, the suppressor gate, holds point 102 at, or very near, ground potential, suppressing the signal appearing through resistor 73.

Diodes 71 and 72 comprise the "OR" gate 17 of FIG. 1. The action is such that a Y (+) signal impressed on entry 10 or at point 102 will raise point 103 to a high positive potential, constituting a Y (+) signal at point 103.

Resistors 73 and 74 and diode 70 and transistor 69 comprise the suppressor gate 18 of FIG. 1. Their operation is such that a positive signal propagated through either diode 71 or 72 would normally raise point 103 to a high positive potential; however, if transistor 51 is conducting, resulting in a Y (−) signal on point 101, then point 103 and the output of transistor 69, line 40, are clamped to a low potential which is effectively an N (−) signal on line 40.

Resistors 82, 83, 81, transistor 80 and resistor 79 perform identical functions with their counterparts, resistors 52, 53, 54, 50 and transistor 51 above. They comprise "AND" gate 20 and buffer 21 of FIG. 1.

Resistor 96 and diode 90 comprise suppressor 21 of FIG. 1 and perform identically as did resistor 62 and diode 61 above.

Resistor 98 and diode 97 comprise suppressor 23 of FIG. 1 and perform identically with resistor 73 and diode 63 above.

Diodes 94 and 95 comprise "OR" gate 24 of FIG. 1 and perform identically with diodes 71 and 72 above.

Resistors 98, 99, diode 91 and transistor 89 with its biasing resistors 92 and 93 comprise the suppressor 25 of FIG. 1 and their operation is essentially the same as the combination of resistors 73, 74, diode 70 and transistor 69, with the exception that transistor 69 was operating as an emitter follower resulting in a Y (+) signal on line 40. Transistor 89, however, operates as a common emitter amplifier causing a Y (−) signal at its output, line 43.

Resistors 59 and 60 with resistor 68 comprise the "OR" gate 27 of FIG. 1. Their function is such that a Y (+) signal either on line 41 or 44 will raise point 104 and, accordingly, the base of transistor 56 so high as to cause transistor 56 to switch, reducing point 105 to a low signal corresponding to a Y (−) signal.

Diode 57 with resistors 59 and 60 constitute the suppressor 31 of FIG. 1. The function is such that a Y (−) signal at input 32 operating through diode 57 as the control input effectively clamps point 104 at ground, creating an N (−) signal regardless of the signal impressed on line 41 or 44. A Y (−) signal at input 32 is, therefore, equivalent to the instruction, "Yes, do not subtract."

Transistor 56 and resistor 55 constitute buffer 34 of FIG. 1 and its function is to convert a Y (+) signal at point 104 to a Y (−) signal at point 105.

Diode 77 and diode 78 constitute the "OR" gate 26 of FIG. 1. Their function is such as to permit a Y (−) signal on either line 42 or 39 to produce a Y (−) signal at point 106.

Resistor 76 and diode 75 constitute the suppressor 29 of FIG. 1 in which a Y (+) signal at the control gate input 28 transmitted through diode 75 maintains point 107 at an N (+) potential regardless of the signal at point 106. Thus, a Y (+) signal on input 28 is the instruction, "Yes, do not add."

Resistor 66, diode 67 and resistor 76 constitute the current limiting "OR" gate 48 whose function is such as to produce at point 108 a Y (−) signal if there occurs a Y (−) signal on either line 46 or line 48.

Transistor 64 constitutes buffer 49 of FIG. 1 and produces a Y (+) signal at output terminal 37 if there is a Y (−) signal at point 108.

Resistors 86, 87 and 85 along with the bias voltage $+V_b$ constitute an "AND" gate (30 of FIG. 1) that permits point 109 to be driven sufficiently negative to constitute a Y (−) signal at point 109 only if there is a Y (−) signal present on both line 39 and input 16.

The combination of resistors 86, 87, 85 and resistor 88 comprise the "OR" gate 33 of FIG. 1 which permits point 109 to be driven to a Y (−) state if there is a Y (−) signal on line 39 and input 16 or if there is a Y (−) signal on line 43.

Transistor 84 is the buffer 35 of FIG. 1 which converts a Y (−) signal at point 109 to a Y (+) signal on line 47 at output terminal 38.

Referring again to FIG. 4 and recalling the signal to be impressed on inputs P, E, K, $\overline{S}$, $\overline{A}$, F, or 10, 11, 16, 28, 32 and 19, respectively, the operation of the preferred embodiment is as follows: AY (+) signal representing an augend 1 impressed on input P, point 10, will produce a Y (+) signal through the "OR" gate complex of resistor 74, and diode 72 at point 103. This Y (+) signal will be transmitted through transistor 69 into the "OR" gate complex of resistor 99, diode 95 and resistor 92 as a Y (+) signal. This Y (+) signal will be inverted to a Y (−) signal by transistor 89, thence through "OR" gate complex of resistor 88 at point 109 where it appears as a Y (−) signal. This is inverted by transistor 84 as a Y (+) signal on the sum output T, point 38, thereby satisfying the second line of Truth Table No. 1.

Similarly, a Y (+) signal impressed on the E input, point 11, representing an addend 1, if there is an N (−) signal on the P input and the F input, points 10 and 19, will be transmitted through the "OR" gate complex comprised of resistor 73 and diode 71, thence through transistor 69 to "OR" gate complex of resistor 99, diode 95, thence to output 38, the sum output T, in a manner identical to that just previously described. This process thereby satisfies line 3 of Truth Table No. 1.

In similar fashion, a Y (+) signal representing a carry is impressed on terminal F, point 19, at the same time signal on line 39 will be transmitted through the "OR" as an N (−) signal is impressed on both P terminal 10 and E terminal 11, transmits through the "OR" gate complex comprised of resistor 98, diode 94, thence through transistor 89 and on to output 38, the sum output, as a 1 output in the same fashion as that just previously described. This chain satisfies line 5 of Truth Table No. 1.

In the case where a Y (+) signal is applied simultaneously to both the P input and the E input, points 10 and 11 of the arithmetic unit, then there will be generated a Y (−) signal at point 101 which will appear on line 39 and also will suppress any signals being transmitted through point 103 so that there will not be a sum output represented at point 38; instead however, the Y (−) gate complex of diodes 77 and 78 to point 107. If there is not a "not add" signal at point 28 (in other words, if the arithmetic unit is permitted to add) this Y (−) signal on point 107 will be impressed along line 48 through the "OR" gate complex of resistor 66 and diode 67 to transistor 64 where it will produce a Y (+) signal at point 37, the G output or "carry out," thereby satisfying line 4 of Truth Table No. 1.

In similar fashion, a "carry in" on point 19, coupled with a sum 1 on line 40 operating through the "AND" gate of resistors 82, 83 and 81 and through transistor 80 will suppress any sum signals passing through "OR" gate complex of diodes 94 and 95. Instead however, a Y (−) signal will be present on line 42 which will go through the "OR" gate complex of 77, 78 at point 106 and thence on to carry output terminal G, or point 37, in the same fashion just previously described. This action satisfies either line 6 or line 7 of Truth Table No .1.

In the case that there is a Y (+) "not add" signal on input 28 and there is not a "not subtract" signal at input 32, a subtrahend input at point E will be transmitted through resistor 62 onto line 41, thence through the "OR" gate complex of resistors 59 and 60 through the suppressor of diode 57 and resistor 59 to point 104. From there, the signal is impressed on the base of transistor 56 where it is inverted to a Y (−) signal at point 105, thence along line 46 through the "OR" gate complex of resistor 66 and diode 67 to point 108. From there it is inverted by transistor 64 and appears on terminal G, point 37, where it constitutes a "borrow-out" signal, since under the conditions the arithmetic unit is permitted to subtract and not permitted to add. At the same time the subtrahend signal is impressed on point 103 via the "OR" gate of resistors 73 and 74. From point 103 it traverses the "sum" chain to appear as a difference, Y (+) signal at output T, point 38. These two outputs satisfy line 3 of Truth Table No. 2.

In similar fashion, a borrow input on input F, point 19, in the absence of Y (+) signals on either points 10 or 11, will be transmitted through resistor 96 along line 44 through resistor 60 and thence to terminal G, point 37 as a borrow output in the same fashion as that just previously described. Also, the "borrow-in" signal will enter the "sum" chain via the "OR" gate of diodes 94 and 95 and thence appear as a Y (+) signal at output T, point 38, as a difference. These two outputs satisfy line 5 of Truth Table No. 2.

It is to be noted that in the event that there are two Y (+) signals present at P and E inputs or present at the F input and on line 40 (due to only one signal on either the P or E input) then the buffers 51 or 80 are acting in such manner as to suppress the generation of either an erroneous borrow signal or an erroneous sum signal. This action takes place through suppressor diodes 61 and 70 or diodes 90 and 91.

The action of the "AND" gate comprised of resistors 86, 87, 85 and bias voltage $+V_b$ is novel in that it is necessary to restore a sum output that might otherwise be cancelled during bypass or K control operations. It will be recalled that under K (or bypass) control, a borrow or a carry signal must be generated to indicate the need for K control, but this borrow or carry must not be permitted to affect the sum output present at terminal T, point 38. That is, if an input is present at terminal P, point 10, then this signal must appear at output 38, terminal T, as a sum. In the special case of a 1 appearing at terminal P, point 10, and a 1 also at terminal E, point 11, or at terminal F, point 19, and K control, there will not be available a sum signal on line 43; however, if there is a Y (−) signal at point 101 or a Y (−) signal at point 110, then there must have been a Y (+) signal at input P, point 10; therefore the "AND" gate comprised of resistors 86, 87, 85 and the bias voltage $+V_b$ restore this Y (+) signal to the sum chain.

Also shown in FIGURES 1 and 3*b* is an external circuit for supplying the K or bypass control signal to the K control terminal 16. This external circuit comprises an AND gate 112, an inverting buffer 114 and an OR gate 116. In FIGURE 3*b*, the G output terminal $G_{2,n}$ of the highest order or *n*th stage of the second row is connected to one input of AND gate 112, and an array control signal is applied to the other input for performing division or root extracting. When a borrow occurs in the *n*th stage and a proper array control signal is applied, a bypass or K control signal is produced on the output of OR gate 116 and is applied to the K terminal of each of the arithmetic units in the second row. Furthermore, as a convenience and to increase flexibility, a second input is provided on OR gate 116 for receiving a K control signal from any other external source.

It is undoubtedly apparent to those versed in the art that many simplifications can be made to the embodiment shown herein, particularly if the arithmetic unit is to be used in a complex that does only add operations, such as add, multiply, power generation or other; or only subtract operations, such as subtract, divide, root extraction or other. In such case, it should be pointed out that the controlling stage (the *n*th stage above) may be simply modified so that its borrow out circuit supplies a Y (−) signal by letting buffer 49 be a non-inverting buffer or, if the add chain is not required, by letting buffer 34 drive terminal 37 directly. It can also be seen that, depending on the current handling capability of the output buffer, the output signal from this stage could be used directly, without need for items 112, 114 and 116, as the K control signal for all of the second row units including the *n*th unit. In this sense, it is a novel feature of the invention that the arithmetic unit itself is capable of generating its own bypass control if matrix function or conjoining circuits permit.

It is clear from the foregoing description of a preferred embodiment of the invention that, in accordance with the stated objects, a change in any of the input signals or control signals produces a corresponding change in the output of the improved arithmetic unit without requiring external circuits for detecting the change or for recycling. Furthermore, since the output correction is in direct response to the input change, the information flow is along a most efficient path.

In addition, as discussed in the above-cited copending application, the K control circuit, as well as the $\overline{\text{Add}}$ and $\overline{\text{Sub}}$ circuit, have response time characteristics different from the signal channel and may be used in specialized applications to enhance or alter the basic response characteristic of the arithmetic unit.

There has been described in detail an improved arithmetic unit which embraces all the advantages of similarly employed prior art arithmetic units; which utilizes less complex circuitry than most prior units; which does not require that the complements of the inputs be obtained; and which is faster due to a reduced number of components. The preferred embodiment of the invention utilizes the presences and absences of voltage levels to represent 1's and 0's. A "1" input to the arithmetic unit has been shown as a distinct plus or positive level voltage, although the condition may be reversed within the unit. In addition, the circuitry shown, for simplicity, utilizes diodes, resistors and transistors. The use of these devices is not meant to be restrictive on the invention since the same functions can be performed with relays, hydraulic or pneumatic valves, mechanical linkages, etc.

While the invention has been particularly shown and described with reference to a preferred embodiment thereof, it will be understood by those skilled in the art that the foregoing and other changes in form and details may be made therein without departing from the spirit and scope of the invention.

I claim:

1. A binary full adder-subtractor with bypass control comprising:

(a) a sum or difference logic chain normally responsive to first and second binary bit signals corresponding to the respective arguments on which the desired arithmetic operation is to be performed and a carry or borrow-in bit signal for producing an output bit signal, (b) bypass control means responsive to a bypass control signal and connected to said sum or difference logic chain for causing one of said first or second binary bit signals to be produced as said output bit signal thereby suppressing the desired arithmetic operation when a bypass control signal is present, and (c) A carry or borrow logic chain responsive to said first and second binary bit signals and said carry or borrow-in bit signal for producing a carry or borrow-out bit signal irrespective of whether a bypass control signal is present or not.

2. A binary full adder-subtractor as defined in claim 1 further comprising:

(a) means responsive to a carry-out bit signal resulting from addition of said first and second binary bit signals to generate a bypass control signal, and (b) means to apply said bypass control signal to said bypass control means.

3. A binary full adder-subtractor as defined in claim 1 further comprising means to apply a carry-out bit signal resulting from the addition of said first and second binary bit signals directly to said bypass control means.

4. A binary full adder-subtractor as defined in claim 1 wherein said sum or difference logic chain includes a signal suppressor device connected to receive as its input one of said first or second binary bit signals, said device being responsive to a bypass control signal from said bypass control means to block one of said first or second binary bits from said sum or difference logic chain.

5. A binary full adder-subtractor as defined in claim 4 wherein said signals are electric signals, and said suppressor device and said logic chains comprise semiconductor logic circuits.

6. A binary full adder-subtractor as defined in claim 1 wherein one of said first or second binary bit signals is designed as a minuend and the other as a subtrahend and further comprising mode control means coupled to said carry or borrow logic chain and responsive to a subtract control signal to cause said adder-subtractor to subtract said subtrahend bit signal from said minuend bit signal to produce the difference bit signal as said output bit signal.

7. A binary full adder-subtractor as defined in claim 6 further comprising:

(a) means responsive to a negative difference of said first and second binary bit signals to generate a bypass control signal, and (b) means to apply said bypass control signal to said bypass control means.

8. A binary full-adder-subtractor as defined in claim 6 further comprising means to apply a borrow-out signal resulting from the negative difference of said first and second binary bit signals directly to said bypass control means.

References Cited

UNITED STATES PATENTS

| | | | |
|---|---|---|---|
| 3,395,271 | 7/1968 | Stewart | 235—173 |
| 3,317,721 | 5/1967 | Berlind | 235—176 |
| 3,315,069 | 4/1967 | Bohm | 235—176 X |

OTHER REFERENCES

Ivan Flores: The Logic of Computer Arithmetic, 1963, Prentice-Hall, Inc., pp. 129–149.

MALCOLM A. MORRISON, Primary Examiner

DAVID H. MALZAHN, Assistant Examiner

U.S. Cl. X.R.

235—175